9539X
D. Ulam.
Rotary Steam Engine.
Patented Mar. 23, 1836.
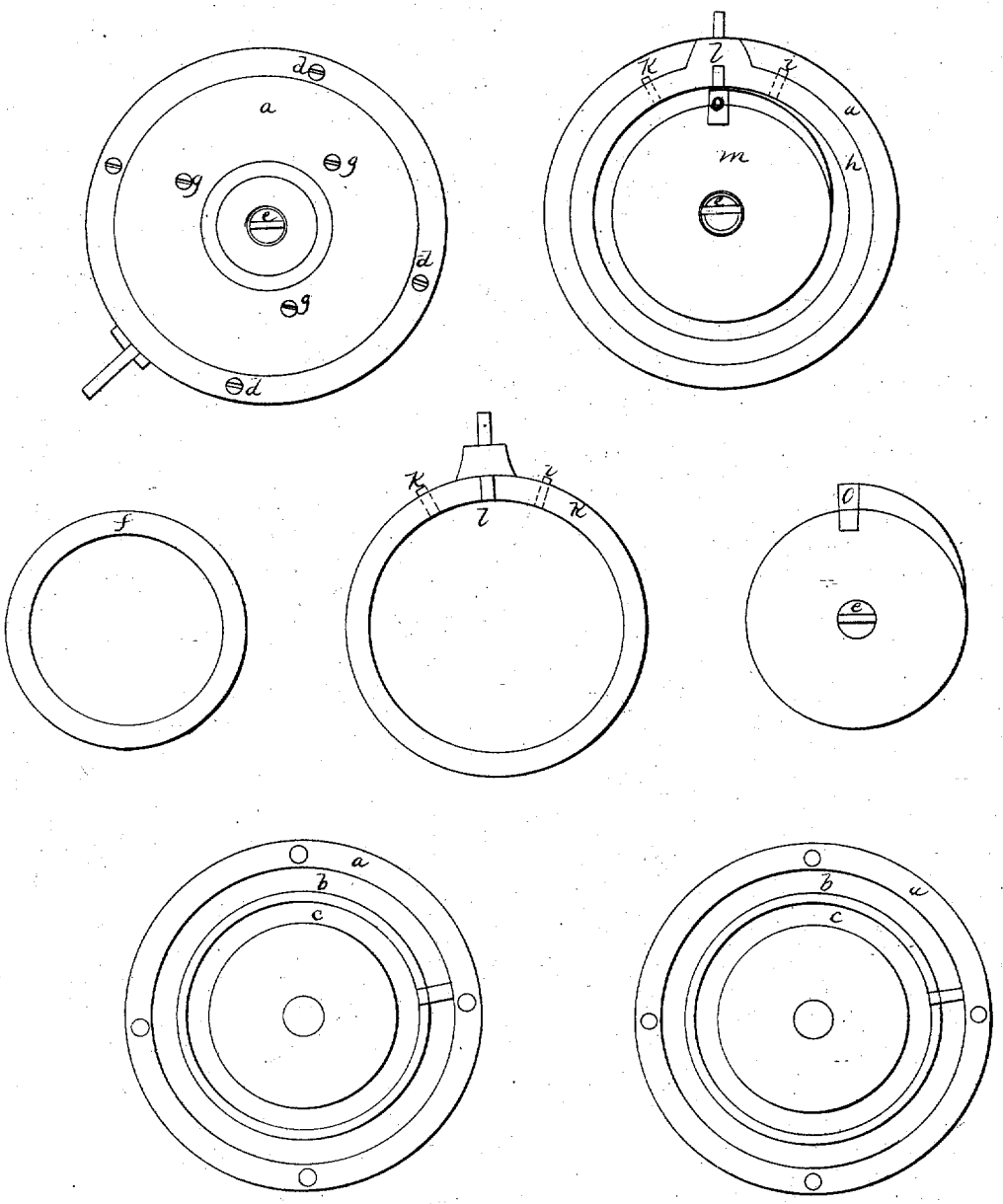
N. PETERS, PHOTO-LITHOGRAPHER, WASHINGTON, D. C.

9539X 3-23-1836

David Ulam of Greensburg Pennsylvania

Letters Patent

The Schedule referred to in these Letters Patent and making part of the same containing a description in the words of the said David Ulam himself of his Improvement in the Rotary Steam Engine.

Be it known that I David Ulam of Greensburg, in the County of Westmoreland and State of Pennsylvania have invented a new and useful improvement in the Rotary Steam Engine, which is described as follows, reference being had to the annexed drawings of the same, making part of this specification.

This Engine consists of two circular plates, embracing a circular rim, secured together by bolts, forming a circular chamber, within which revolves a wheel driven by the expansive force of steam admitted thro' a tube in the rim and acting on a stop projecting from the periphery of the wheel and filling the steam chamber; it escapes thro' another tube in the rim, there is also a sliding [illegible] working in an opening in the rim, which valve is operated by the machinery of the Engine. The shaft of the revolving wheel which conveys the power to machinery passes thro' round the apertures in the centre of the circular plates. The circular plates marked a. in the annexed drawings are made of any convenient diameter and thickness, and have two circular concentric ~~circular~~ grooves. b. c. cut in them, on the sides towards the inside of the steam chamber, one of which is to receive the rim and the other the packing. There are also apertures for the screw bolts, d. which secure the plates together; & an aperture in the centre for the shaft. e. of the revolving wheel. In the groove for the packing, and below it is placed a flat ring f. which is intended to force the packing close against the revolving wheel by screws. g. which pass through the plates and act upon ring, forcing it with the packing against the wheel. The rim. h. is of the same diameter as the outer concentric groove in which it is to be placed, and of any suitable depth and as thick as the groove is wide. it has three openings in its circumference. - one i. for the introduction of the stream; another. k. for its discharge, and a third, l. for the
valve. The revolving circular wheel, m. which revolves within the
rim, being of a less diameter than the rim, leaves a space n. between
the periphery of the wheel, and the inside of the rim. for the steam
which acts on a projection or stop o. of the wheel. this stop fills
the space just mentioned, for the steam. The wheel is fastened per-
manently to its shaft, which passes thro' apertures in the centre
of the circular plates, and is for conveying the power to any machin-
ery required. The two plates are put together so as to embrace the rim
and form a circular chamber for the steam, and for the circular wheel
turning therein, and are secured together by the screw-bolts before
mentioned. The packing is pressed against the sides of the revol-
ving wheel by the screws and rings, for preventing the escape of the steam.
The stop is made to work tight by placing packing over it and se-
curing the same by a screw and plate. There may be one or more stops.
The steam enters the steam chamber thro' the introduction tube &
passes between the valve and the stop of the wheel and by its expan-
sive force turns the wheel. and when the steam arrives at the educ-
tion tube it escapes into the atmosphere. The valve is withdrawn
by the wedgelike form of the stop and returned at the moment re-
quired by a spring or weight or by an attachment of machinery for
that purpose. The motion of the engine may be made more reg-
ular by the addition of a balance wheel.
What I claim as my invention, and which I desire to secure
by Letters Patent consists in the before described Rotary Steam Engine Sgd. Witnesses
W.C. Wm. P. Elliot David Mann.
Charles A. May.

Drawing 725